US008278862B2

(12) United States Patent
Coleman et al.

(10) Patent No.: US 8,278,862 B2
(45) Date of Patent: Oct. 2, 2012

(54) MOTOR CONTROL SYSTEMS, FOLDABLE PARTITIONS EMPLOYING MOTOR CONTROL SYSTEMS, METHODS OF MONITORING THE OPERATION OF ELECTRIC MOTORS AND FOLDABLE PARTITIONS

(75) Inventors: W. Michael Coleman, Salt Lake City, UT (US); Duane O. Hall, Sandy, UT (US); E. Carl Goodman, Bountiful, UT (US); Michael D. George, Kaysville, UT (US); D. George Field, Pleasant Grove, UT (US)

(73) Assignee: Won-Door Corporation, Salt Lake City, UT (US)

( * ) Notice: Subject to any disclaimer, the term of this patent is extended or adjusted under 35 U.S.C. 154(b) by 598 days.

(21) Appl. No.: 12/501,255

(22) Filed: Jul. 10, 2009

(65) Prior Publication Data

US 2011/0005689 A1    Jan. 13, 2011

(51) Int. Cl.
*H02P 7/00* (2006.01)

(52) U.S. Cl. ............ 318/432; 318/434; 318/430; 361/5; 361/6; 361/1; 361/23; 49/26; 49/28; 49/24

(58) Field of Classification Search ................ 49/26, 28, 49/24; 361/5, 6, 23, 1; 318/432, 434, 430, 318/98
See application file for complete search history.

(56) References Cited

U.S. PATENT DOCUMENTS

| 4,834,161 A | 5/1989 | Johnson et al. |
| 4,924,929 A | 5/1990 | Johnson et al. |
| 5,167,575 A * | 12/1992 | MacDonald .................. 454/187 |
| 6,038,819 A * | 3/2000 | Klein .............................. 49/362 |
| 6,082,053 A * | 7/2000 | Bischof et al. .................... 52/64 |
| 6,194,856 B1 * | 2/2001 | Kobayashi et al. ........... 318/432 |
| 6,405,782 B1 * | 6/2002 | Cheng ..................... 160/168.1 P |
| 6,556,457 B1 * | 4/2003 | Shimazaki et al. ............. 363/34 |
| 6,662,848 B2 * | 12/2003 | Goodman et al. ......... 160/84.02 |
| 6,971,296 B2 * | 12/2005 | Lin et al. ......................... 83/404 |
| 7,050,283 B2 * | 5/2006 | Field et al. .................... 361/106 |
| 7,066,297 B2 * | 6/2006 | Goodman et al. ......... 160/84.02 |
| 7,190,132 B2 | 3/2007 | Goodman et al. |
| 7,211,975 B2 | 5/2007 | Murray et |

(Continued)

FOREIGN PATENT DOCUMENTS

JP    05213424    8/1993

(Continued)

OTHER PUBLICATIONS

International Search Report and Written Opinion dated Jan. 24, 2011 for PCT Application No. PCT/US2010/040888 filed Jul. 2, 2010, 9 pages.
Banta et al, Methods, Systems, and Devices for a Motor Control System, U.S. Appl. No. 12/256,687, filed Oct. 23, 2008.

*Primary Examiner* — Rita Leykin
(74) *Attorney, Agent, or Firm* — TraskBritt

(57) ABSTRACT

Motor control systems comprise a motor control circuit, a processing circuit operably coupled to the motor control circuit, and a current sensor operably coupled to the processing circuit. The current sensor may be configured to sense a current and to convey a signal to the processing circuitry proportional to an amount of current sensed. The processing circuitry may be configured to sample the signal to obtain a plurality of current values, to store the plurality of current values and to generate an operation profile from the plurality of current values. Folding partitions comprising motor control systems are also disclosed, as well as methods of monitoring an operation of an electric motor and of monitoring for an obstruction of a folding partition.

23 Claims, 6 Drawing Sheets

U.S. PATENT DOCUMENTS

| | | |
|---|---|---|
| 7,342,370 B2 | 3/2008 | Greene et al. |
| 7,503,205 B2 | 3/2009 | Baillargeon et al. |
| 7,503,594 B2 | 3/2009 | Peacock et al. |
| 7,810,282 B2 * | 10/2010 | Oxley ............................ 49/362 |
| 7,926,538 B2 * | 4/2011 | Coleman et al. ........... 160/84.08 |
| 8,087,444 B2 * | 1/2012 | Goodman ..................... 160/118 |
| 2005/0131606 A1 | 6/2005 | Motozawa et al. |
| 2008/0184623 A1 | 8/2008 | Heigl et al. |

FOREIGN PATENT DOCUMENTS

| | | |
|---|---|---|
| JP | 2006238698 | 9/2006 |
| KR | 10-2006-0120657 | 11/2006 |
| KR | 10-2007-0096362 | 10/2007 |
| KR | 10-2008-0036571 | 4/2008 |

\* cited by examiner

MOTOR CONTROL SYSTEMS, FOLDABLE PARTITIONS EMPLOYING MOTOR CONTROL SYSTEMS, METHODS OF MONITORING THE OPERATION OF ELECTRIC MOTORS AND FOLDABLE PARTITIONS

TECHNICAL FIELD

Embodiments of the present disclosure relate generally to motor control systems. In particular, various embodiments of the present disclosure relate to motor control systems for detecting current requirements of an electrical load and to foldable partitions employing such motor control systems.

BACKGROUND

Control circuits and systems for controlling an electrical load, such as an electric motor, and a movable device driven thereby are numerous and varied in their operation. Some such systems may control the operation of the electric motor and/or the movable device, others may provide over current protection for deactivating the motor based on excess current to the electric motor, while others may provide various combinations of features.

One example of such a motor and movable device employing control circuits includes conventional automatic doors. Such doors are implemented in various configurations such as, for example, sliding doors, rotating panel doors, folding doors, and revolving doors. Automatic doors are often relied on for security and fire safety purposes. These automatic door systems often include various sensors and switches to assist in the control of the doors. For example, a conventional automatic door, when used as a fire door, may include a switch or actuator in a lead post for detecting an obstruction of the door while the door is closing, which may indicate a person trying to pass by the door when it is closing. Actuation of this switch typically temporarily stops the door from closing and allows access through the barrier formed by the door(s) for a predetermined amount of time. Unfortunately, positioning this switch in the lead post makes it difficult or impossible to functionally include other features in the lead post area.

BRIEF SUMMARY

Various embodiments of the present disclosure comprise control systems, doors and related methods for controlling an electrical load, such as a motor, to detect anomalous operational activities. Such anomalous activities may include detecting an obstruction to the electrical load.

One or more embodiments of the disclosure include motor control systems. In one or more embodiments, the motor control system may comprise a motor control circuit operably coupled to an electrical load. A processing circuit may be operably coupled to the motor control circuit and to a current sensor. The current sensor may be configured to sense a current delivered to the motor control circuit and to convey a signal to the processing circuitry proportional to the amount of current sensed. The processing circuitry may be configured to sample the signal to obtain a plurality of current values, to store the plurality of current values and to generate an operation profile from the plurality of current values.

Other embodiments comprise methods of monitoring the operation of an electric motor. One or more embodiments of such methods may comprise generating an operation profile comprising a plurality of current values corresponding to at least one of a time of operation and position of a movable device. A threshold profile may be generated from the operation profile, and at least one subsequent current value may be compared to the threshold profile. The at least one subsequent current value may correspond to at least one of the time of operation and the position of the movable device to the threshold profile.

In yet additional embodiments, the present disclosure includes folding partitions. In various embodiments, a folding partition may comprise a plurality of panels. Each panel of the plurality of panels may be hingedly coupled with an adjacent panel of the plurality of panels. A lead post may be attached to at least one panel of the plurality of panels. A drive may comprise a transmission member coupled to the trolley and a motor configured to drive the transmission member. A motor control circuit may be operably coupled to the motor and a processing circuit may be operably coupled to the motor control circuit. A current sensor may be operably coupled to the processing circuitry and configured to sense a current delivered to the motor control circuit from a power source. The current sensor may convey a signal to the processing circuitry proportional to the amount of current sensed and the processing circuitry may be configured to sample the signal to obtain a plurality of current values and to generate an operation profile from the plurality of current values.

Still other embodiments comprise methods of monitoring for an obstruction of a folding partition. One or more embodiments of such methods may comprise obtaining a plurality of current values. Each current value may correspond to one of a plurality of positions of a folding partition. A threshold profile may be generated from the plurality of current values. At least one subsequent current value corresponding to a position of the folding partition may be obtained and the at least one subsequent current value may be compared to the threshold profile to determine if the at least one subsequent current value is greater than the threshold profile.

DETAILED DESCRIPTION

The illustrations presented herein are, in some instances, not actual views of any particular foldable partition or motor control system, but are merely idealized representations which are employed to describe the present invention. Additionally, elements common between figures may retain the same numerical designation.

In the following detailed description, circuits and functions may be shown in block diagram form in order not to obscure the present invention in unnecessary detail. Additionally, block definitions and partitioning of logic between various blocks as depicted is non-limiting, and comprise examples of only specific embodiments. It will be readily apparent to one of ordinary skill in the art that the present invention may be practiced in a variety of embodiments implementing numerous other partitioning solutions.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process is terminated when its acts are completed. A process may correspond to a method, a function, a procedure, a subroutine, a subprogram, etc. Furthermore, the methods disclosed herein may be implemented in hardware, software, or both.

Figure 1:
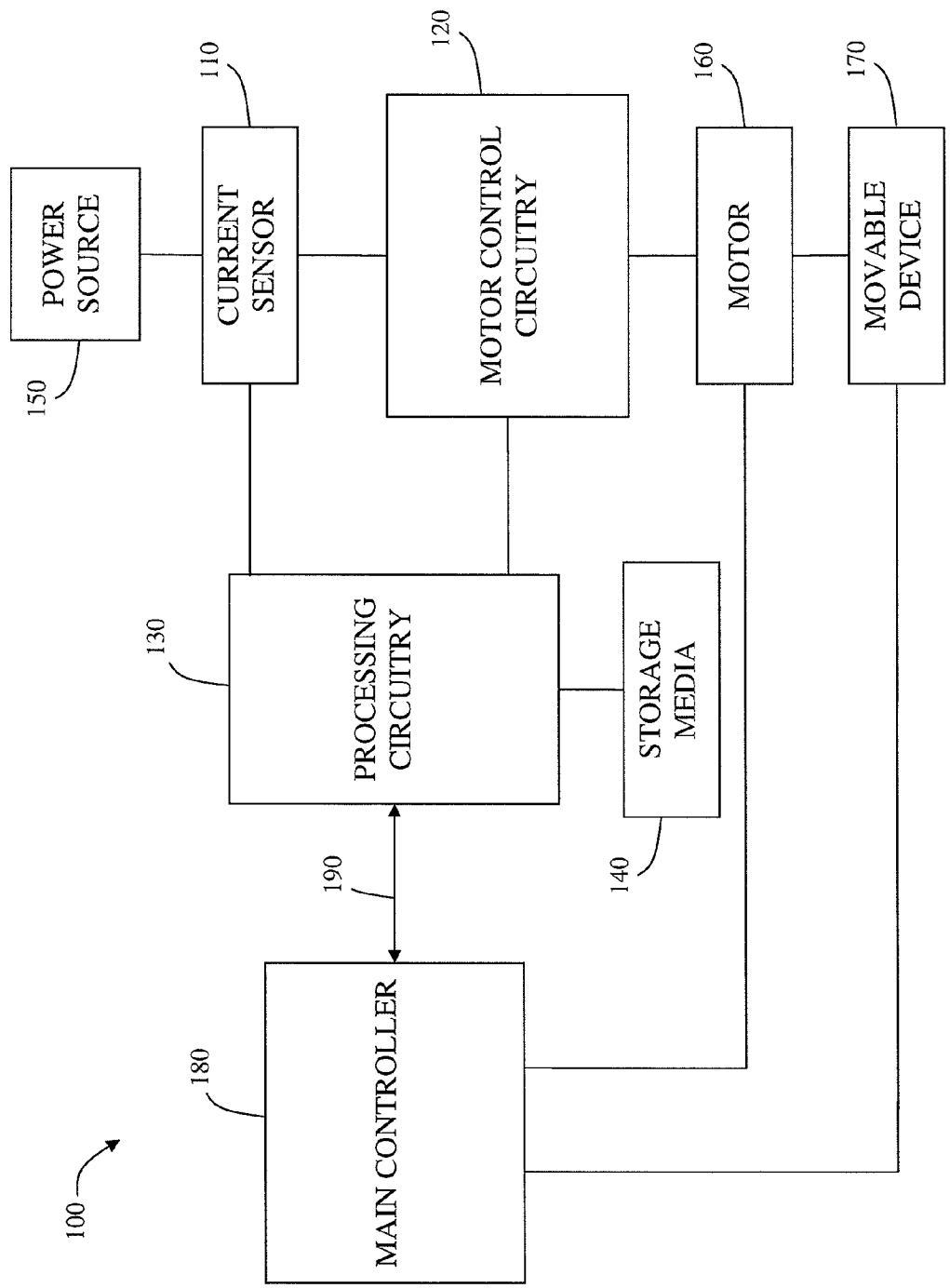
FIG. 1 is a block diagram illustrating a motor control system in accordance with at least one embodiment of the present disclosure.

In the following description, certain terminology is used to describe certain features of one or more embodiments of the invention. For instance, the term "bus" refers to a plurality of signals or conductors, which may be used to transfer one or more various types of information, such as data, addresses, control, or status. Additionally, a bus or a collection of signals may be referred to in the singular as a signal. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal Various embodiments of the present invention comprise motor control systems for controlling one or more motors in association with a variety of applications. FIG. 1 illustrates a motor control system 100 in accordance with at least one embodiment of the present disclosure. The motor control system 100 may be configured to monitor an operational cycle of a load and dynamically adjust a threshold current value of the motor control system 100 in accordance with the operational cycle of the load. Moreover, the motor control system 100 may be configured to stop the operation of the load in the event a current supplied to the load exceeds the threshold current value. The motor control system 100 may comprise a current sensor 110 operably coupled to a motor control circuit 120, both of which are operably coupled to processing circuitry 130, and storage media 140 accessible by the processing circuitry 130.

The current sensor 110 is coupled to a power source 150 configured to provide power to the motor control circuit 120. The current sensor 110 may comprise any current sensor suitable for generating an analog or digital signal, wherein the signal is proportional to the amount of current flowing through current sensor 110. A current sensor 110 that is configured to generate an analog signal may be coupled to an analog-to-digital converter to sample the input and convert it to a digital value suitable for use by the processing circuitry 130. The analog-to-digital convertor may comprise a stand-alone analog-to-digital converter coupled between the current sensor 110 and the processing circuitry 130 or an analog-to-digital converter included in the processing circuitry 130. A current sensor that is configured to generate a digital signal may directly interface to the processing circuitry 130 to present a digital value suitable for use by the processing circuitry 130. By way of example only, and not by way of limitation, the current sensor 110 may comprise a conventional Hall Effect current sensor, as will be understood by a person having ordinary skill in the art.

The processing circuitry 130 is arranged to obtain, process data, send data, control data access and storage, issue commands, and control other desired operations. Processing circuitry 130 may comprise circuitry configured to implement desired programming provided by appropriate media in at least one embodiment. For example, the processing circuitry 130 may be implemented as one or more of a processor, a controller, a plurality of processors and/or other structure configured to execute executable instructions including, for example, software and/or firmware instructions, and/or hardware circuitry. Embodiments of processing circuitry 130 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor but, in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. These examples of processing circuitry 130 are for illustration and other suitable configurations within the scope of the invention are also contemplated.

The methods or algorithms described in connection with the examples disclosed herein may be embodied directly in hardware, in firmware, in a software module executable by the processing circuitry 130, or in a combination thereof, in the form of processing unit, programming instructions, or other directions, and may be contained in a single device or distributed across multiple devices. The storage media 140 is configured to store programming such as executable code or instructions (e.g., software and/or firmware), electronic data, databases, or other digital information and may include processor-usable media. A storage medium may be any available media that can be accessed by a general purpose or special purpose computer. By way of example and not limitation, a storage medium may comprise one or more devices for storing data, including read-only memory (ROM), random access memory (RAM), magnetic disk storage mediums, optical storage mediums, flash memory devices, and/or other computer-readable mediums for storing information. For example, a software module may reside in RAM memory, Flash memory, ROM memory, EPROM memory, EEPROM memory, registers, hard disk, a removable disk, a CD-ROM, or any other form of storage medium 140 known in the art. The storage media 140 may be coupled to the processing circuitry 130 such that the processing circuitry 130 can read information from, and write information to, the storage media 140. In the alternative, the storage media 140 may be integral to the processing circuitry comprising a conventional processor.

Processor-usable media may be embodied in any computer program product(s) or article(s) of manufacture, which can contain, store, or maintain programming, data and/or digital information for use by or in connection with an instruction execution system including the processing circuitry 130. For example, suitable processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, RAM, ROM, Flash memory, cache memory, and/or other configurations capable of storing programming, data, or other digital information.

The motor control circuit 120 is operably coupled to a load 160, which in turn may be coupled to a movable device 170. For explanation purposes only, load 160 will be referred to herein as a motor 160. Motor 160 may be operably coupled to an output of the motor control circuit 120. By way of example and not limitation, the motor 160 may comprise a reversible DC motor. The motor control circuit 120 may comprise conventional circuitry configured to control a rotational direction of the motor 160 in accordance with one or more received control signals. In one or more embodiments, the motor control circuit 120 may comprise a motor control arrangement in an H-bridge configuration to control the rotational direction of a motor, such as either of the arrangements described in U.S. Pat. No. 7,190,132 and U.S. patent application Ser. No. 12/256,687, now U.S. Pat. No. 8,115,427, issued Feb. 14, 2012, the entire disclosures of which are incorporated herein by this reference.

The motor control system 100 may also include a main controller 180 operably coupled to the processing circuitry 130 via a bus 190. The main controller 180 may be any suitable controller and may be configured to, for example only, monitor the state of motor 160 or the movable device 170 driven by motor 160, monitor other aspects related to the control of the movable device 170, and thereby operate the movable device 170 under a defined set of parameters or rules. As illustrated, the main controller 180 may be communicatively coupled to the motor 160 and the movable device 170. The main controller 180 may be further configured to transmit and receive one or more status signals via bus 190 to the processing circuitry 130 related to an operational state or status of the motor 160, the movable device 170, or a combination thereof. For example only, a status signal related to an operational state of the movable device 170 may comprise an "alarm" or "fault" status signal, a "service" status signal, or a "moving" status signal. Furthermore, for example only, a status signal related to an operational state of the motor 160 may comprise a "start up" status signal, a "steady state" status signal, or an "off" status signal.

In operation, a signal may be communicated to the motor control circuit 120 causing the motor control circuit 120 to energize the motor and provide a current from the power source 150 to the motor 160. The provided current is sensed with the current sensor 110 and a signal proportional to the amount of current sensed with the current sensor 110 is communicated to the processing circuitry 130. The processing circuitry 130 is configured to sample the signal at discrete positions (e.g., positions of the motor or positions of the movable device) or times to obtain a plurality of current values. The processing circuitry 130 is configured to analyze the current values obtained, as well as to compare the values to any previously acquired values and/or to store the values as needed, as will be discussed in further detail hereafter.

In many applications, a load may require varying amounts of current during an operational cycle of the load. In other words, the current provided to the load may vary over the course of a single operational cycle. For example, the motor 160 may require a higher current during a "start up" mode than what is required during a "steady state" mode. Furthermore, the motor 160, the movable device 170 or both may encounter several irregularities or other anomalies during an operational cycle causing the current requirements to fluctuate even during the "steady state" mode. In some applications, certain fluctuations in the current requirements may signify a problem of some sort. For example, when a movable device 170 is stopped or substantially restrained from motion during an operational cycle, the motor 160 may require a substantially higher current as compared to a normal operation of the movable device 170. However, certain fluctuations may also be considered part of a normal operational cycle.

Various embodiments of the current disclosure relate to methods of monitoring an electrical load, such as motor 160. First, an operation profile of the required current values over the course of a single operational cycle of the motor 160 may be generated. The operation profile may be employed to generate a threshold profile. Finally, one or more subsequent required current values may be compared to the threshold profile to determine whether any errors or anomalies exist.

At least some embodiments of the motor control system of the present disclosure may be employed to perform embodiments of the methods of monitoring an electric load. The motor control system of the present disclosure is configured to monitor the current requirements of a normal operational cycle of a load and to identify normal fluctuations as well as deviations from the normal operational cycle that may occur in subsequent operational cycles. The processing circuitry 130 is configured to generate and store an operation profile of the required current values over the course of a single operational cycle. The operation profile may comprise a plurality of current values for an operational cycle corresponding to a time of operation, a position, or both, of the movable device 170, the motor 160, or a combination thereof. By way of example and not limitation, current values may be obtained by sampling the signal from the current sensor 110 every 5 milliseconds of operation through a full operational cycle, or 1000 times over the distance of displacement of the movable device through a full operational cycle (e.g., every 0.12 inch (about 3.05 mm) for a distance of displacement of 10 feet (about 3.05 m), or some combination thereof. Each current value may further be stored by the processing circuitry 130.

Figure 2A:
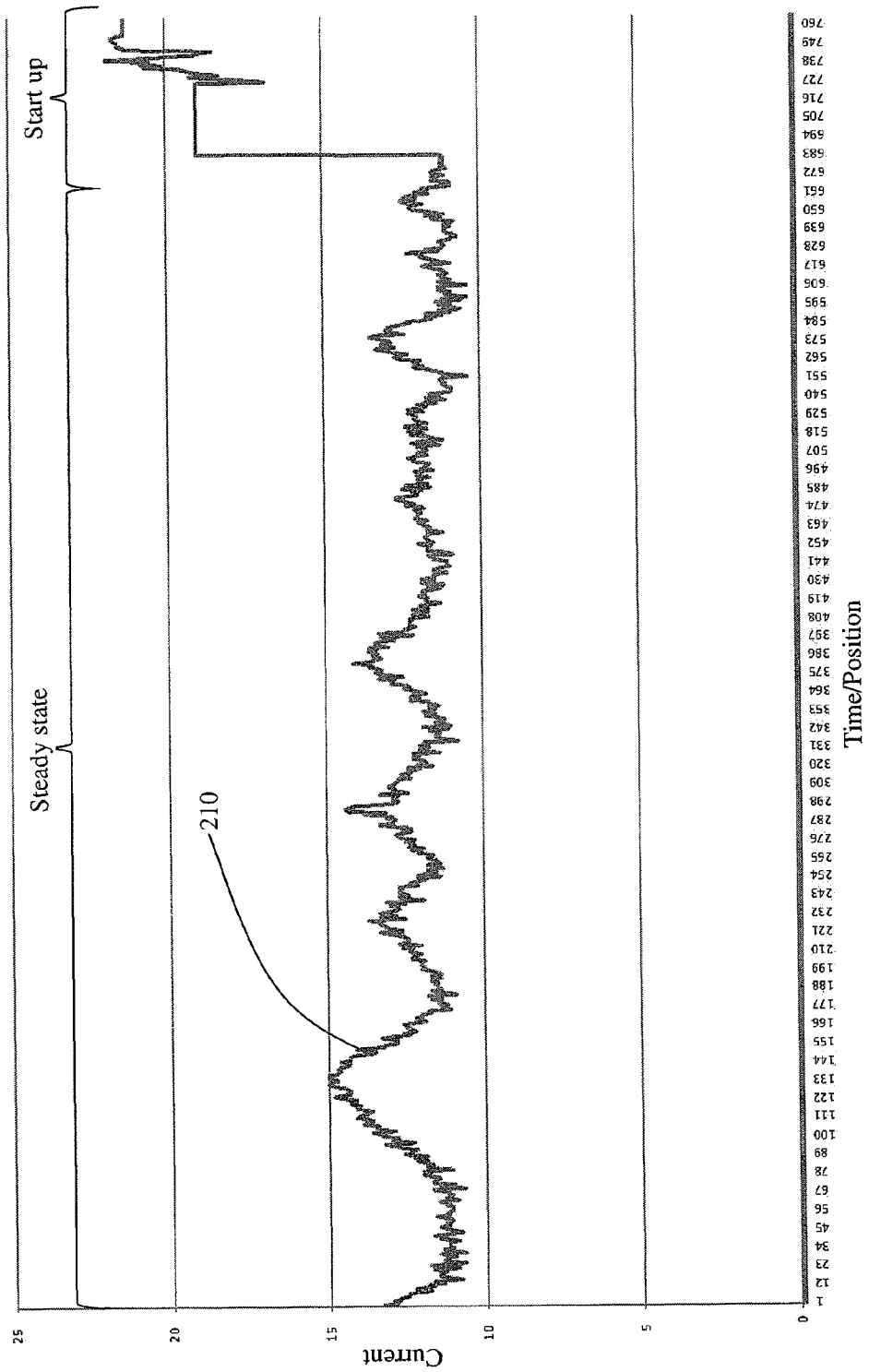
FIG. 2A illustrates an operation profile of the sampled current values of a load through one fall operational cycle according to at least one embodiment.

FIG. 2A illustrates an operation profile 210 of the sampled current values for a motor 160 through one full operational cycle according to at least one embodiment. As shown, the current requirements may be greater during a "start up" mode as indicated on the right-most portion of the graph and may decrease as the motor 160 continues into a "steady state" mode in which the operation is continuous. As also illustrated in FIG. 2A, the current values through the "steady state" mode may fluctuate, as indicated by the portion of the graph left of the "start up" through the end of the operational cycle at the left-most side of the graph.

Figure 2B:
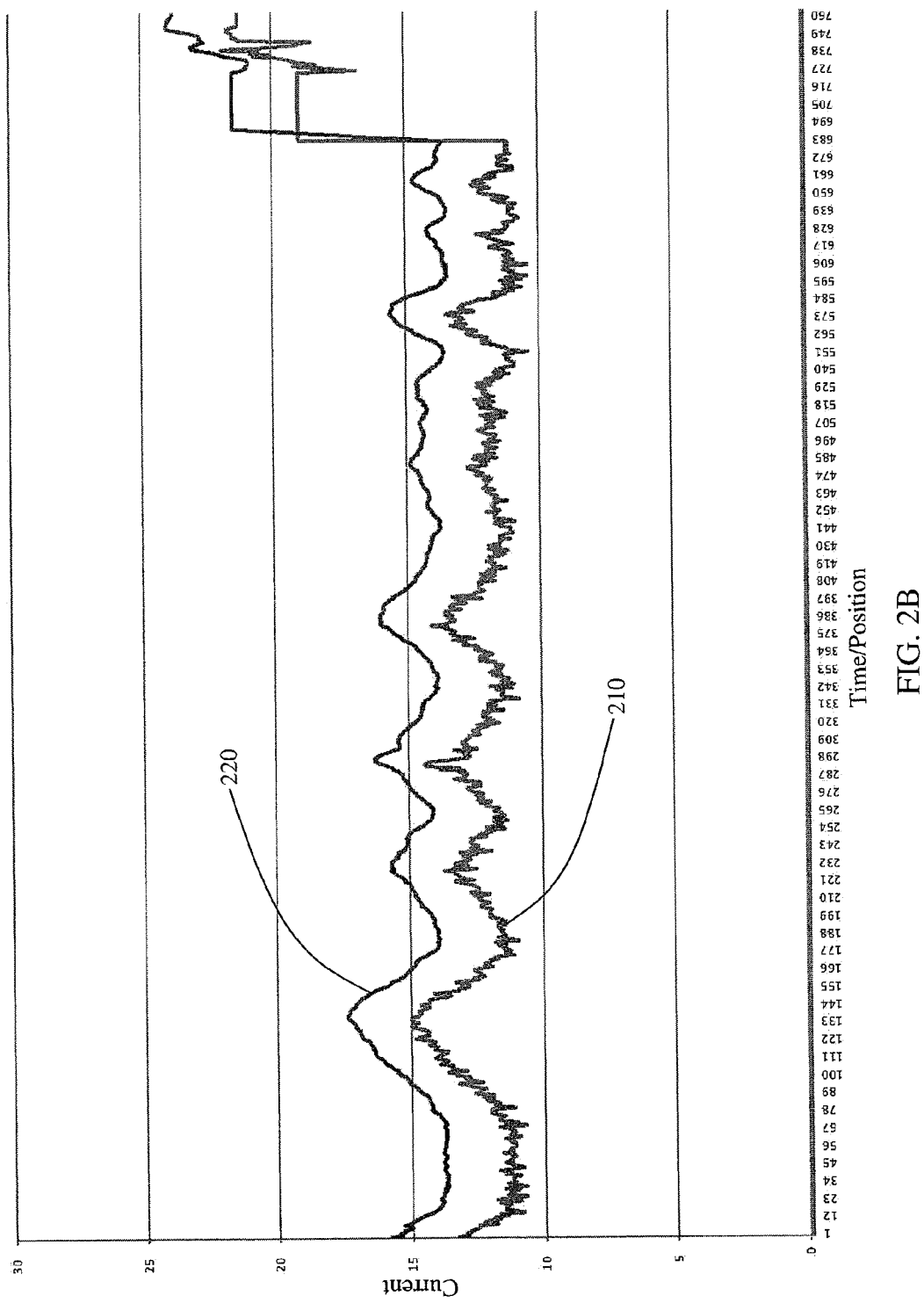
FIG. 2B illustrates the operation profile of FIG. 2A with the corresponding threshold profile.

With a full operational cycle completed and the current values obtained and stored, the processing circuitry 130 is configured to generate a threshold profile. The threshold profile comprises a profile of current values, which may be employed by the motor control system 100 to determine if current values obtained during a subsequent operational cycle indicate a problem. The threshold profile may be generated using the stored current values comprising the operation profile, and by offsetting the operation profile by a selected threshold offset. In addition to offsetting the operation profile by the threshold offset, the operation profile curve may be smoothed out by averaging discrete groups of consecutive values to generate the threshold profile. FIG. 2B illustrates the operation profile 210 of FIG. 2A with the corresponding threshold profile 220 generated therefrom. By way of example and not limitation, an operation profile may be offset by a selected number, such as 35 units, and may be averaged using a rolling average of groups of 8 consecutive current values to smooth out the curve. In addition, the threshold offset may be a value that varies with time, position, or a combination thereof. As a non-limiting example, the threshold offset may be greater in areas of peak current in the operational profile and lesser in areas of substantially constant current in the operation profile.

Over time, many motors 160 and movable devices 170 change due to aging of materials and components. Therefore, at least some embodiments of the motor control system 100 of the present disclosure are configured to update the threshold profile 220. In at least some embodiments, the processing circuitry 130 is configured to utilize current values obtained during each subsequent operational cycle to update and refine the threshold profile 220. For example, after a first fully completed operational cycle, the threshold profile 220 may be generated. Upon each subsequent operational cycle that is fully completed, a subsequent threshold profile may be generated and the subsequent threshold profile may be combined with the previous threshold profile to generate an updated threshold profile. The subsequent threshold profile and the previous threshold profile may be combined by averaging the two threshold profiles together in at least some embodiments. In such a manner, the threshold profile comprises a dynamic threshold profile since the threshold profile is dynamically updated to adapt to changing materials or other conditions. Generally, a threshold profile as well as a subsequent threshold profile will not be generated if an operational cycle is not fully completed or an anomalous event occurs during the operational cycle. In other words, if the motor 160 and/or the movable device 170 are stopped or inhibited from completing a full operational cycle, the data obtained during the partial cycle may not be employed for generating a threshold profile.

Figure 2C:
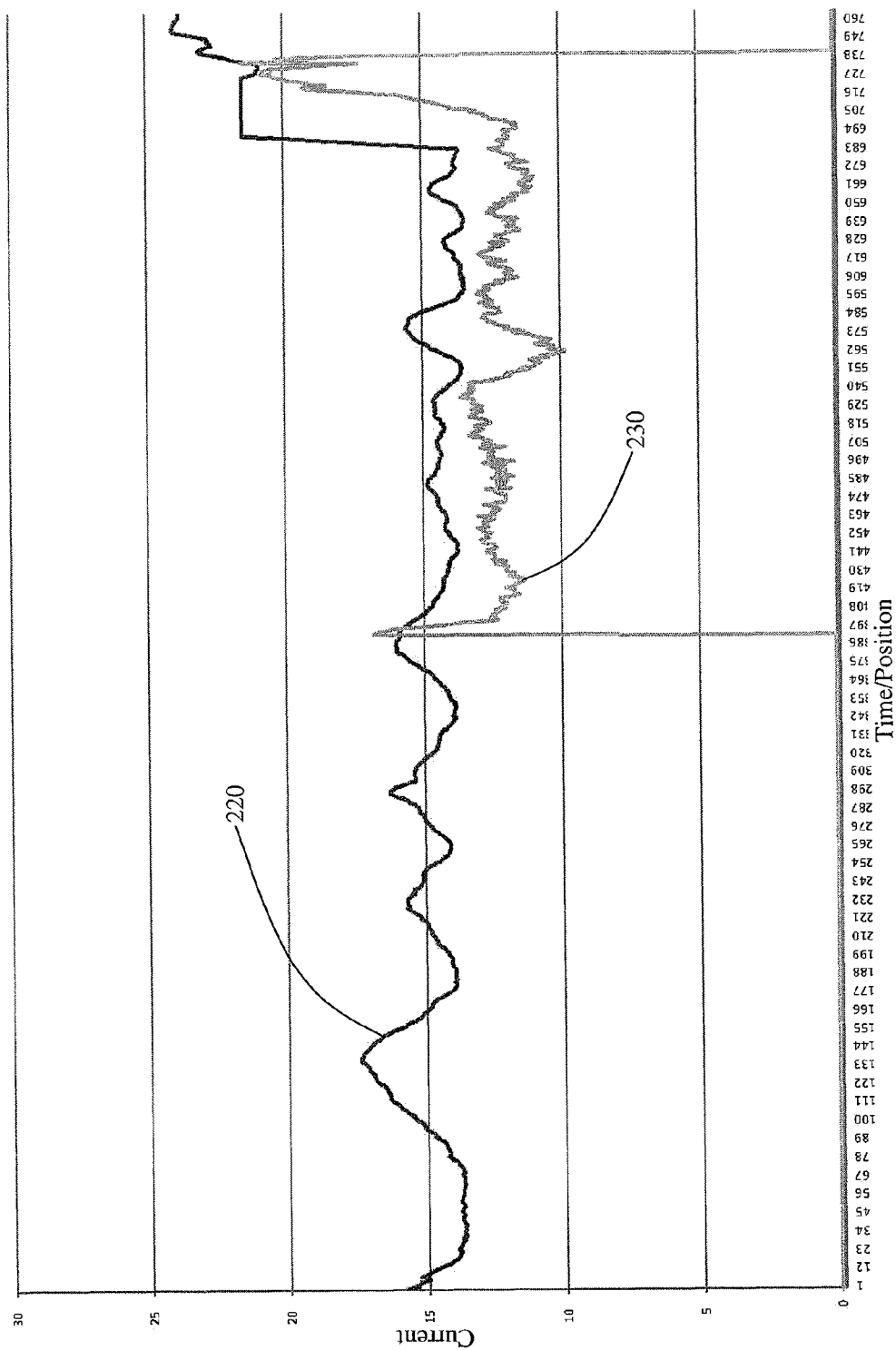
FIG. 2C illustrates an operation profile of a subsequent operational cycle in relation to the threshold profile of FIG. 2B.

With the threshold profile 220, current values from subsequent operational cycles may be compared to the threshold profile 220 to identify a substantial variance in the normal operational cycle. FIG. 2C illustrates an operation profile 230 of a subsequent operational cycle in relation to the threshold profile 220. As shown, during the subsequent operational cycle, the current values remain below the threshold profile 220 at the beginning of the operational cycle toward the right side of the profile, indicating normal operation. About midway through the operational cycle, the current spikes to a level above the threshold profile 220. The processing circuitry 130 is configured to compare the current values required for the motor 160 during the subsequent operational cycle in at least substantially real time. The processing circuitry 130 may stop operation of the motor 160, typically by means of the motor control circuit 120, upon an indication of a substantial variance from normal operating current values, since such a variance may indicate a problem with the motor 160 or the movable device 170. As illustrated in FIG. 2C, the current values drop to about zero after the current went above the current values of the threshold profile 220, indicating that operation of the motor 160 and the movable device 170 was ceased.

Figure 3:
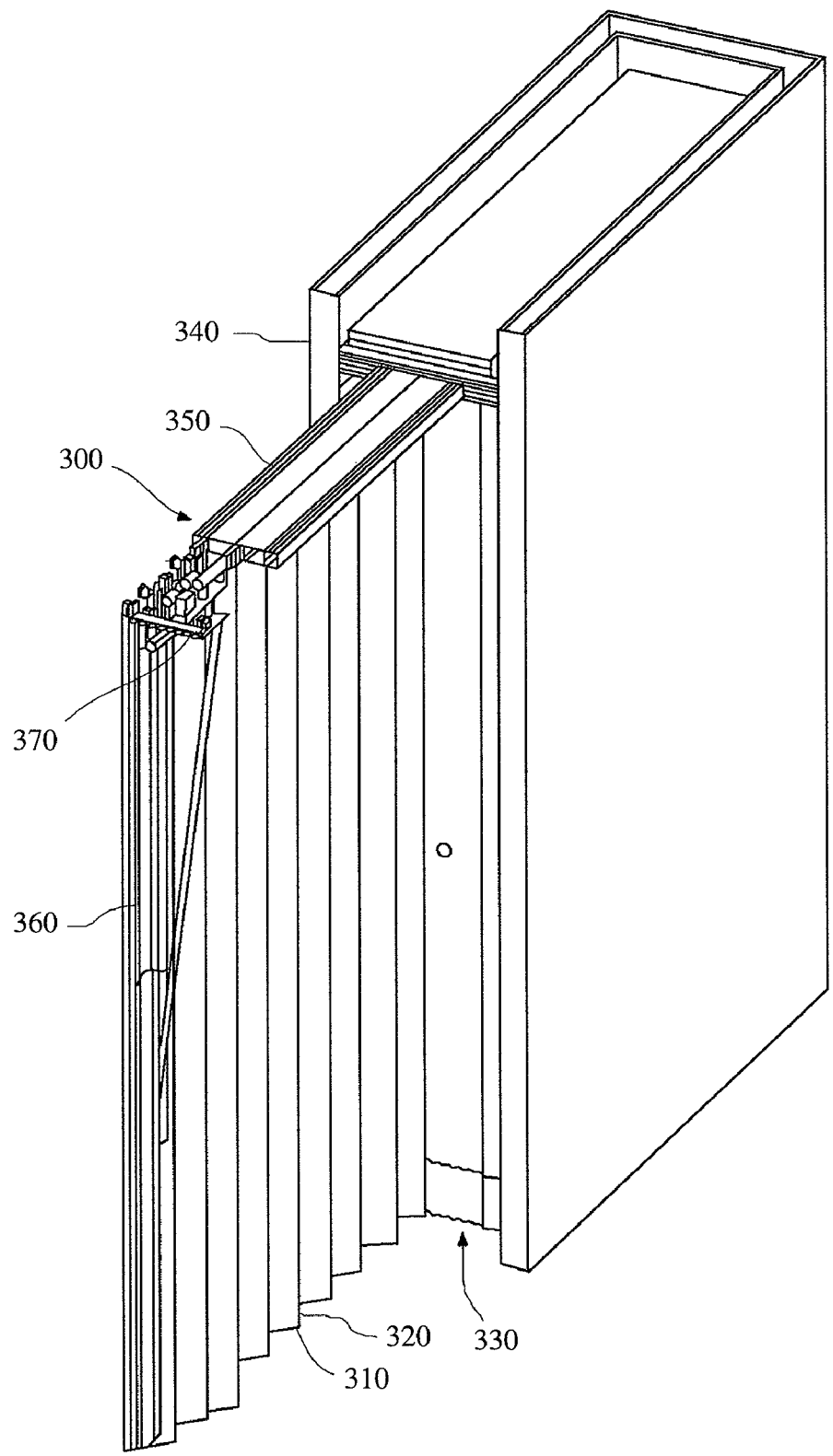
FIG. 3 illustrates a movable device comprising a foldable partition according to at least one embodiment comprising a motor control system of the present disclosure.

Numerous and varying applications employing an electrically controlled motor may employ a motor control system 100 of the present disclosure, as will be appreciated by those of ordinary skill in the art. In at least some embodiments of the present disclosure and by way of a non-limiting example, the movable device 170 may comprise a movable door or a movable folding partition, such as is described in U.S. Pat. No. 6,662,848 entitled AUTOMATIC DOOR AND METHOD OF OPERATING SAME, the disclosure of which is hereby incorporated in its entirety by reference. FIG. 3 illustrates a movable device comprising a foldable partition, such as an accordion-type door 300 having an embodiment of a motor control system 100 of the present disclosure. The door 300 comprises a plurality of panels 310 with adjacent panels 310 connected to one another with hinges 320 or other hinge-like members. The hinged connection of the individual panels 310 enables the panels 310 to fold relative to each other in an accordion or a plicated manner such that the door 300 may be compactly stored in a pocket 330 formed in a wall 340 of a building when in a retracted or folded state.

When it is desired to deploy the door 300 to an extended position, for example, to secure an area such as an elevator lobby or other area during a fire, the door 300 is displaced along a track 350 across the space to provide an appropriate barrier. When in a deployed or an extended state, a leading edge of the door 300, shown as a male lead post 360, complementarily or matingly engages with a jamb or door post (not shown) that may be formed in a wall of a building or another door.

A drive, which may include, for example, a motor 160 (FIG. 1) and a conventional transmission member such as a drive belt or chain (not shown), may be configured to open and close the door 300 upon actuation thereof, as is known to those of ordinary skill in the art. A trolley 370 is coupled to a portion of the chain and configured to ride or slide along the track 350. The trolley 370 may be coupled to, for example, the lead post 360 such that displacement of the trolley 370 results in corresponding displacement of the lead post 360 and the panels 310 attached thereto. The door 300 may further comprise a motor control system 100 (FIG. 1) as described above for controlling the operation of the motor 160.

The motor 160 may require a variable amount of current during operation depending on a number of differing factors. By way of example and not limitation, the required current for the motor 160 may vary depending on whether the motor 160 is initially starting, the number of panels 310 of the door 300 that the motor 160 is displacing at a given time, any irregularities or resistance in the track 350 on which the foldable partition travels, whether the travel of the foldable partition is obstructed, etc.

It has been discovered that when a foldable partition, such as door 300, encounters an obstruction, the current supplied to the motor 160 rises to a level substantially higher than normal operating levels. Furthermore, it is typically desirable to configure a foldable partition to stop if the foldable partition encounters an obstruction while closing since such an obstruction may represent a person attempting to escape an area that is on fire or filled with smoke. Therefore, the processing circuitry 130 of the motor control system 100 may be configured to monitor the current requirements for the motor 160 while the door 300 is closing, and to stop the door if the current requirements are above a threshold.

As described above, the processing circuitry 130 of the motor control system 100 may be configured to generate a dynamic threshold profile for comparing current requirements of operational cycles of the door 300. For the door 300, an operational cycle may comprise displacing the door 300 from a fully open position to a fully closed position. As the door 300 is being closed, the current sensor 110 senses the current being supplied to the motor control circuit 120 and communicates a signal comprising a value of the supplied current to the processing circuitry 130. As described above, the processing circuitry 130 is configured to generate and store an operation profile comprising the current values at a plurality of door positions between the fully open and fully closed positions. The processing circuitry 130 is further configured to generate a threshold profile from the initial operation profile for the door 300.

Once the threshold profile is generated and stored, the threshold profile may be updated and refined each time the door 300 is operated through a full cycle (i.e., from fully open to fully closed). Furthermore, the current provided to the motor control circuit 120 may be monitored each time the door 300 operates to determine in substantially real time whether the door 300 has encountered an obstruction by determining whether the current supplied to the motor control circuit 120 exceeds the threshold current for each position of the threshold profile. If the supplied current exceeds the threshold current at some position of the operational cycle, the motor control system 100 may be configured to stop the door 300 from advancing further.

Figure 4:
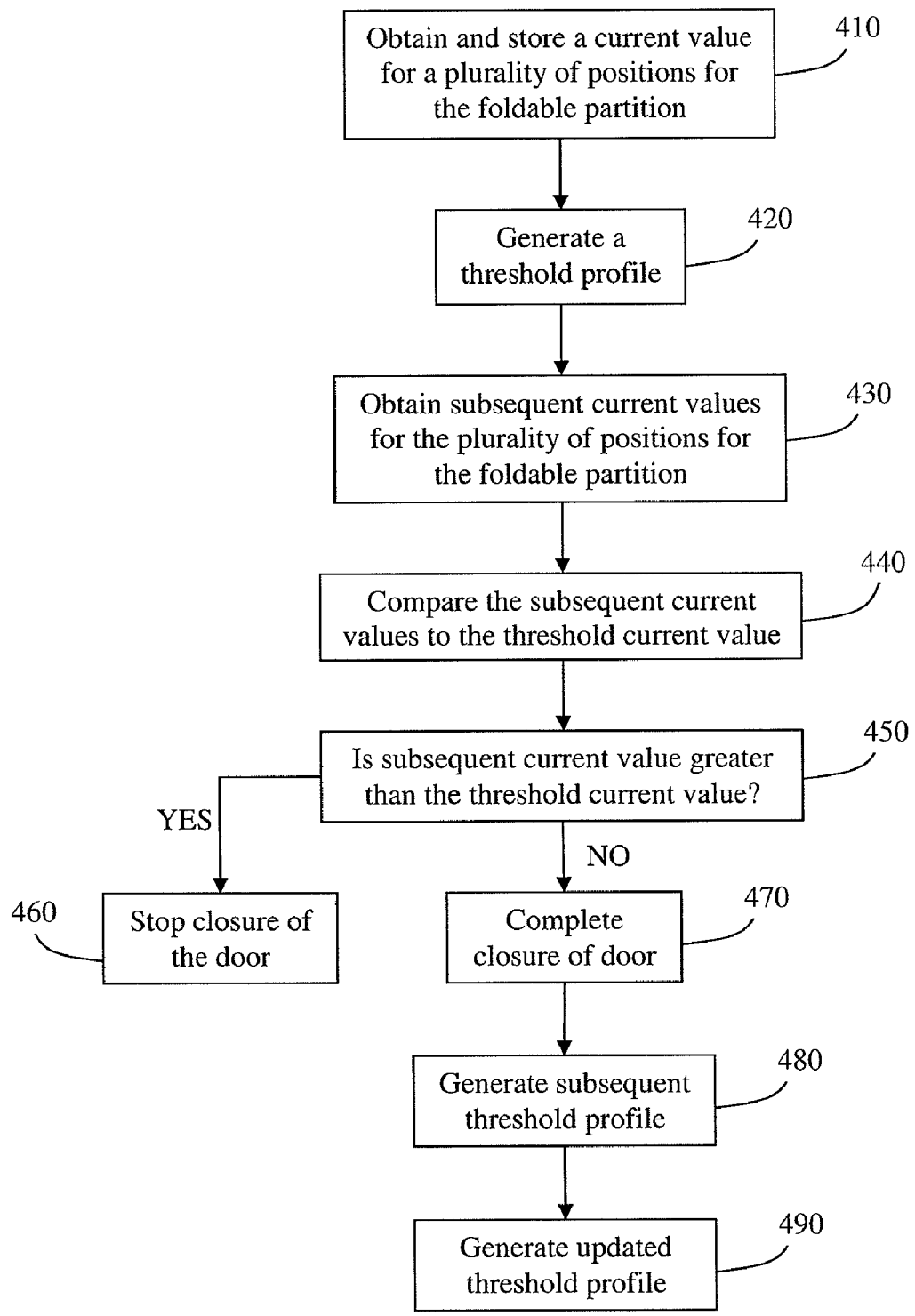
FIG. 4 is a flowchart of at least one embodiment of such a method of monitoring for an obstruction of a foldable partition.

Various embodiments of the present disclosure are directed to a method of monitoring for an obstruction of a foldable partition, such as door 300. FIG. 4 is a flowchart of at least one embodiment of such a method, which is described herein with reference to FIGS. 1-4. Initially, a plurality of current values may be obtained and stored at operation 410. The plurality of current values comprises a current value for a plurality of positions of the door 300 between a fully open position and a fully closed position. The plurality of positions may relate to a distance the door 300 has traveled, an amount of time the door 300 has traveled, as well as one of a plurality of positions (i.e., the entire distance may be broken up into 300 equal positions). The current values may be generated by the current sensor 110 and a related signal may be obtained and stored by the processing circuitry 130.

A threshold profile is generated using the plurality of current values at operation 420. In at least one embodiment, the threshold profile may be generated by adding a threshold offset to each of the current values of the plurality. Furthermore, some embodiments may also include reducing the total number of current values by averaging small groups of the current values together. The threshold profile may therefore comprise a threshold current value for each sampled position of the door 300 between fully open and fully closed.

With a threshold profile generated, each subsequent operation of the door 300 may be monitored for obstructions. In particular, the subsequent current value for each sampled position of the door 300 may be obtained at operation 430. As used herein, the subsequent current value refers to current values generated and obtained during operation of the door 300 subsequent to generation of the threshold profile. The subsequent current values may be compared to the threshold profile at operation 440. In other words, the subsequent current value for each sampled position of the door 300 may be compared to the threshold current value for that same sampled position of the door 300 as defined by the threshold profile. The processing circuitry 130 may be configured to determine whether the subsequent current value is greater than the threshold current value for each particular sampled position of the door 300 at operation 450. If the subsequent current value exceeds the threshold current value as defined by the threshold profile, the door 300 may be stopped at operation 460. In at least some embodiments, the processing circuitry 130 may communicate an obstruction notice or status to the main controller 180 to indicate that an obstruction of door 300 has been identified.

If none of the subsequent current values exceed the threshold current value as defined by the threshold profile, the door 300 may continue to close until the door 300 reaches the fully closed position at operation 470. After the door 300 has successfully completed the operational cycle by reaching the fully closed position without being stopped, the subsequent current values may be employed to generate a subsequent threshold profile at operation 480. The subsequent threshold profile may be generated in a manner similar to generating the threshold profile. For example, the subsequent threshold profile may be generated by adding a constant to each of the subsequent current values of the plurality. Furthermore, some embodiments may also include reducing the total number of subsequent current values by averaging small groups of the subsequent current values together. The subsequent threshold profile is then combined with the threshold profile to generate an updated threshold profile at operation 490. The updated threshold profile replaces the threshold profile for use in future monitoring for an obstruction of the door 300.

While certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Thus, the scope of the invention is only limited by the literal language, and legal equivalents, of the claims that follow.

What is claimed is:

1. A motor control system, comprising:
   a motor control circuit operably coupled to an electrical load;
   processing circuitry operably coupled to the motor control circuit; and
   a current sensor operably coupled to the processing circuitry and configured to sense a current delivered to the motor control circuit and to convey a signal to the processing circuitry proportional to an amount of current sensed;
   wherein the processing circuitry is configured to:
      sample the signal to obtain a plurality of current values over time, to store the plurality of current values, and to generate an operation profile from the plurality of current values;
      generate a threshold profile from the operation profile, the threshold profile comprising a threshold offset added to the plurality of current values; and
      compare at least one subsequent current value to the threshold profile, the at least one subsequent current value corresponding to at least one of a time of operation and a position of a motor in the threshold profile.

2. The motor control system of claim 1, wherein the motor control circuit is configured as an H-bridge motor control circuit.

3. The motor control system of claim 1, wherein the current sensor is configured to convey the signal as an analog signal or a digital signal.

4. The motor control system of claim 1, wherein the current sensor comprises a Hall Effect current sensor.

5. The motor control system of claim 1, further comprising a main controller operably coupled to the processing circuitry.

6. The motor control system of claim 1, wherein the processing circuitry is further configured to compare the plurality of current values to the threshold profile.

7. The motor control system of claim 6, wherein the processing circuitry is further configured to stop operation of the electrical load upon detection of a current value greater than the threshold profile.

8. A method of monitoring the operation of an electric motor, comprising:
   generating an operation profile comprising a plurality of current values corresponding to at least one of a time of operation and a position of a movable device;
   generating a threshold profile from the operation profile comprising adding a threshold offset to each of the plurality of current values comprising the operation profile; and
   comparing at least one subsequent current value to the threshold profile, the at least one subsequent current value corresponding to at least one of a time of operation and a position of the movable device in the threshold profile.

9. The method of claim 8, wherein generating the operation profile comprises:
   sampling a signal from a current sensor over time to obtain the plurality of current values; and
   associating the plurality of current values to the corresponding time of operation, position of the movable device, or a combination thereof.

10. The method of claim 8, further comprising averaging discrete groups of consecutive current values.

11. The method of claim 8, further comprising:
generating at least one subsequent operation profile comprising a plurality of subsequent current values corresponding to at least one of the time of operation and the position of the movable device;
generating a subsequent threshold profile from the at least one subsequent operation profile; and
combining the subsequent threshold profile with the threshold profile to generate an updated threshold profile.

12. The method of claim 8, further comprising stopping operation of an electric motor if the at least one subsequent current value is greater than the threshold profile.

13. A folding partition, comprising:
a plurality of panels, each panel of the plurality of panels hingedly coupled with an adjacent panel of the plurality of panels;
a lead post attached to at least one panel of the plurality of panels;
a trolley coupled to the lead post;
a drive comprising a transmission member coupled to the trolley and a motor configured to drive the transmission member;
a motor control circuit operably coupled to the motor;
processing circuitry operably coupled to the motor control circuit; and
a current sensor operably coupled to the processing circuitry and configured to sense a current delivered to the motor control circuit from a power source and to convey a signal to the processing circuitry proportional to an amount of current sensed;
wherein the processing circuitry is configured to:
sample the signal to obtain a plurality of current values over time and to generate an operation profile from the plurality of current values;
generate a threshold profile from the operation profile, the threshold profile comprising a threshold offset added to the plurality of current values; and
compare at least one subsequent current value to the threshold profile, the at least one subsequent current value corresponding to at least one of a time of operation and a position of the folding partition in the threshold profile.

14. The folding partition of claim 13, wherein the current sensor comprises a Hall Effect current sensor.

15. The folding partition of claim 13, further comprising a main controller operably coupled to the processing circuitry.

16. The folding partition of claim 13, wherein the threshold profile further comprises discrete groups of current values of the plurality of current values averaged together.

17. The folding partition of claim 13, wherein the processing circuitry is further configured to compare a plurality of subsequent current values to the threshold profile.

18. The folding partition of claim 13, wherein the processing circuitry is further configured to:
obtain a plurality of subsequent current values;
generate at least one subsequent operation profile from the plurality of subsequent current values;
generate at least one subsequent threshold profile from the at least one subsequent operation profile; and
combine the at least one subsequent threshold profile with the threshold profile to generate at least one updated threshold profile.

19. A method of monitoring for an obstruction of a foldable partition, comprising:
obtaining a plurality of current values, each current value corresponding to one of a plurality of positions of a folding partition;
generating a threshold profile from the plurality of current values comprising adding a threshold offset to each current value of the plurality of current values;
obtaining at least one subsequent current value corresponding to a position of the folding partition; and
comparing the at least one subsequent current value to the threshold profile to determine if the at least one subsequent current value is greater than the threshold profile.

20. The method of claim 19, wherein obtaining the plurality of current values and obtaining at least one subsequent current value comprises:
sensing a current with a current sensor;
communicating a signal proportional to an amount of current sensed between the current sensor and a processing circuitry; and
repeatedly sampling the signal from the current sensor to correspond to the plurality of positions of the folding partition.

21. The method of claim 19, further comprising stopping operation of the folding partition if the at least one subsequent current value is determined to be greater than the threshold profile.

22. A method of monitoring for an obstruction of a foldable partition, comprising:
obtaining a plurality of current values each current value corresponding to one of a plurality of positions of a folding partition;
generating a threshold profile from the plurality of current values;
obtaining at least one subsequent current value corresponding to a position of the folding partition;
comparing the at least one subsequent current value to the threshold profile to determine if the at least one subsequent current value is greater than the threshold profile; and
averaging small groups of current values of the plurality of current values together, wherein the total number of current values is reduced.

23. A method of monitoring for an obstruction of a foldable partition, comprising:
obtaining a plurality of current values, each current value corresponding to one of a plurality of positions of a folding partition;
generating a threshold profile from the plurality of current values;
obtaining at least one subsequent current value corresponding to a position of the folding partition;
comparing the at least one subsequent current value to the threshold profile to determine if the at least one subsequent current value is greater than the threshold profile;
generating a subsequent threshold profile from a plurality of subsequent current values; and
combining the subsequent threshold profile with a previous threshold profile.

* * * * *

UNITED STATES PATENT AND TRADEMARK OFFICE
CERTIFICATE OF CORRECTION

PATENT NO. : 8,278,862 B2  
APPLICATION NO. : 12/501255  
DATED : October 2, 2012  
INVENTOR(S) : W. Michael Coleman et al.

Page 1 of 1

It is certified that error appears in the above-identified patent and that said Letters Patent is hereby corrected as shown below:

In the specification:
    COLUMN 3,    LINE 57,    Change "convertor" to --converter--

Signed and Sealed this  
Second Day of July, 2013

Teresa Stanek Rea  
*Acting Director of the United States Patent and Trademark Office*